(12) United States Patent
Green

(10) Patent No.: US 7,913,727 B2
(45) Date of Patent: Mar. 29, 2011

(54) STUMP CUTTING TOOL FOR USE WITH A STUMP CUTTING APPARATUS

(76) Inventor: Kevin J. Green, Blissfield, MI (US)

( * ) Notice: Subject to any disclaimer, the term of this patent is extended or adjusted under 35 U.S.C. 154(b) by 629 days.

(21) Appl. No.: 11/610,790

(22) Filed: Dec. 14, 2006

(65) Prior Publication Data

US 2008/0142116 A1    Jun. 19, 2008

(51) Int. Cl.
*A01G 23/06*    (2006.01)

(52) U.S. Cl. ............... 144/24.12; 144/241; 241/294

(58) Field of Classification Search .......... 144/24.12, 144/241; 299/102, 103, 108, 112 R, 112 T; 241/294

See application file for complete search history.

(56) References Cited

U.S. PATENT DOCUMENTS

| | | | | |
|---|---|---|---|---|
| 5,106,166 | A * | 4/1992 | O'Neill ............... | 299/104 |
| 5,743,314 | A * | 4/1998 | Puch .................. | 144/24.12 |
| 6,024,143 | A * | 2/2000 | Ritchey ............... | 144/24.12 |
| 6,138,725 | A * | 10/2000 | Leonardi et al. ....... | 144/235 |
| 6,382,277 | B1 * | 5/2002 | Paumier et al. ........ | 144/235 |
| 6,585,326 | B2 * | 7/2003 | Sollami ............... | 299/104 |

* cited by examiner

*Primary Examiner* — Shelley Self
(74) *Attorney, Agent, or Firm* — Burgess Law Office, PLLC

(57) ABSTRACT

A stump cutting tool for use with a stump cutting apparatus including a rotatable cutting wheel having a pair of side surfaces. A mounting block or pocket forms part of the structure that secures the cutting tool to the cutting wheel. The cutting tool includes a cutting tooth and a tooth holder. The tooth holder includes an elongated shank and a head located adjacent one end of the shank. A bore extends through the head of the tooth holder. The cutting tooth includes an elongated shank with a head portion located adjacent one end thereof. A cutting bit is attached to the head portion. The shank of the cutting tooth disposed and secured within the bore.

25 Claims, 3 Drawing Sheets

STUMP CUTTING TOOL FOR USE WITH A STUMP CUTTING APPARATUS

CROSS-REFERENCE TO RELATED APPLICATIONS

Not Applicable.

BACKGROUND OF THE INVENTION

1. Field of the Invention

The present invention relates generally to a stump cutting apparatus and more specifically to a stump cutting tool used with a stump cutting apparatus.

2. Description of Related Art

Stump cutters or stump cutting machines are generally known in the art and are used to cut or grind stumps. A typical stump cutter includes a plurality of cutting tools mounted to a rotatable cutting wheel or drum. Placing the wheel or drum against a stump and rotating it causes the cutting tools, and more particularly individual cutting teeth, to engage and cut away the stump. Tool holders, sometimes referred to as pockets, are used to secure the cutting teeth to the cutting wheel.

Since the cutting teeth operate in a harsh environment, replacement of the cutting teeth is almost a continuous job. For example, contact with the ground surface rapidly dulls the cutting edge of each cutting tooth. Further, if a cutting tooth strikes something hard such as a stone or rock the cutting tooth or an edge thereof may break or chip requiring replacement of the cutting tooth. In addition, depending upon the particular cutting tooth design or style the cutting tooth often includes a carbide cutting bit. Many cutting tooth configurations use only a portion of the carbide cutting bit, that is only a portion of the cutting bit or cutting bit edge actually performs the cutting or stump grinding operation. Such cutting teeth waste the remaining or unused portion of the carbide cutting bit. Since it is difficult and costly to replace only the carbide cutting bit, the entire cutting tooth must be replaced thereby increasing the overall costs. Finally, continuous loading of the cutting tooth can cause cutting tooth failure including twisting or bending of the shank portion. In some instances, the tooth itself may break thus necessitating replacement.

As cutting tooth replacement is costly both in material replacement costs and man-hours to remove and install each individual new cutting tooth it is desirable to use as much of the cutting bit as possible and replace only the worn, used or damaged cutting bit as necessary while maximizing use of the entire cutting bit. Further, the less material that needs to be replaced, the less the cost of replacement.

U.S. Pat. No. 6,382,277 discloses one type of cutting tooth and tool holder/pocket assembly, the disclosure of which is hereby incorporated by reference. As set forth therein, the '277 patent discloses a stump cutting apparatus including a cutting wheel and a plurality of cutting assemblies mounted on the cutting wheel. The cutting assemblies include first and second pockets, a pair of cutting teeth and a pair of fasteners. Each cutting tooth includes a shank with an enlarged head located on one end of the shank. A cutting bit formed of a hard material is located in a seat formed on the enlarged head and brazed in place. As set forth in the '277 patent, the cutting teeth pass perpendicularly through the cutting wheel and extend a distance from the respective sides of the wheel, whereby the teeth are used to attach the pockets to the wheel without using separate fasteners.

As known in the industry, it is advantageous to use as much of the cutting edge of the cutting bit as possible. U.S. Pat. No. 5,743,314, the disclosure of which is hereby incorporated by reference, discloses an indexable stump cutting tooth that enables rotation of the cutting tooth to expose a new or unused portion of the cutting edge of the cutting bit. Further, once the cutting edges of the cutting bit are used, the cutting tooth can be replaced without having to remove or replace the mounting block or pocket.

Since cutting tooth replacement is costly, it is advantageous to use as much of the cutting bit as possible in order to reduce the overall cost, including the manufacturing and fabrication cost of the cutting tooth itself. Accordingly, there is need in the art for a cutting tooth that maximizes use of the cutting bit while also reducing the amount of material and structure that must be replaced when replacing the cutting bit.

SUMMARY OF THE INVENTION

Accordingly, the present invention provides a cutting tool for use with a stump cutting apparatus using a rotatable cutting wheel or drum. The cutting tool utilizes a cutting tooth supported in a tooth holder. The cutting tooth includes a shank extending along a longitudinal axis with first and second spaced apart ends. A head portion is located adjacent the first end and a cutting bit is attached to the head portion. The tooth holder includes a shank extending along the longitudinal axis having first and second spaced apart ends. A head located adjacent the first end includes a bore extending through the head from a front face to a rear face of the head. The shank of the cutting tooth is disposed and secured within the bore. The cutting tool is then secured to a cutting wheel of the stump cutting apparatus; typically, through use of a mounting block or pocket.

In a further embodiment, the cutting tooth also includes an indexing structure that cooperates with the head of the tooth holder to secure the cutting bit at a plurality of discrete positions. The indexing structure prevents rotation of the cutting tooth during the stump cutting or grinding operation while allowing an operator to stop the stump cutting apparatus and index or rotate the cutting tooth to expose a new or fresh cutting edge.

BRIEF DESCRIPTION OF THE DRAWINGS

FIG. 2 is an exploded perspective view of the stump cutting tool of FIG. 1.

DETAILED DESCRIPTION OF THE PREFERRED EMBODIMENTS

Figure 1:
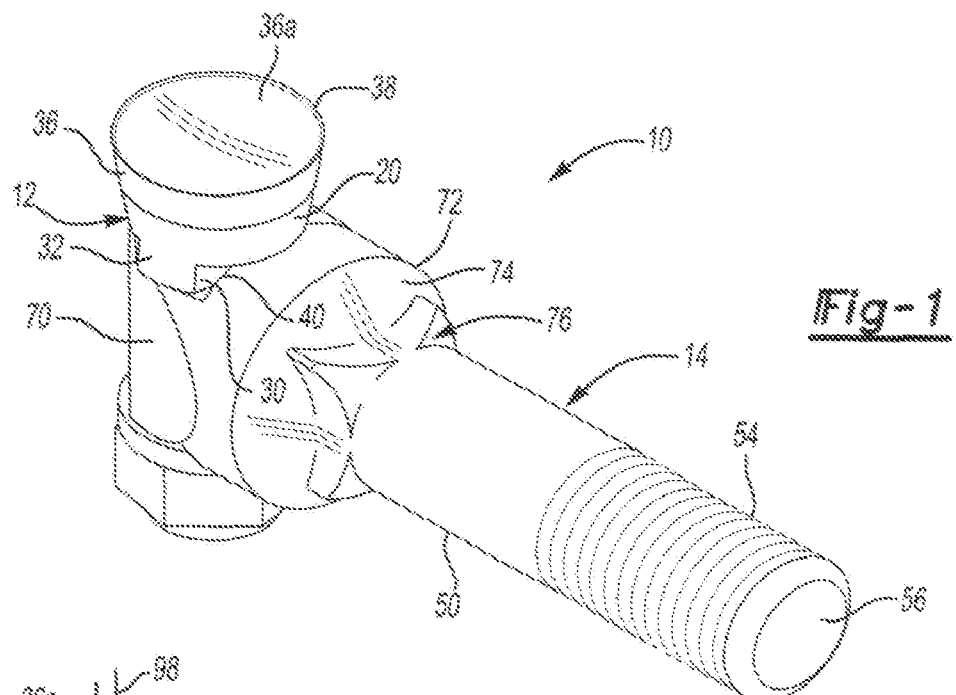
FIG. 1 is a perspective view of a stump cutting tool including a cutting tooth and tooth holder according to the present invention.
Figure 3:
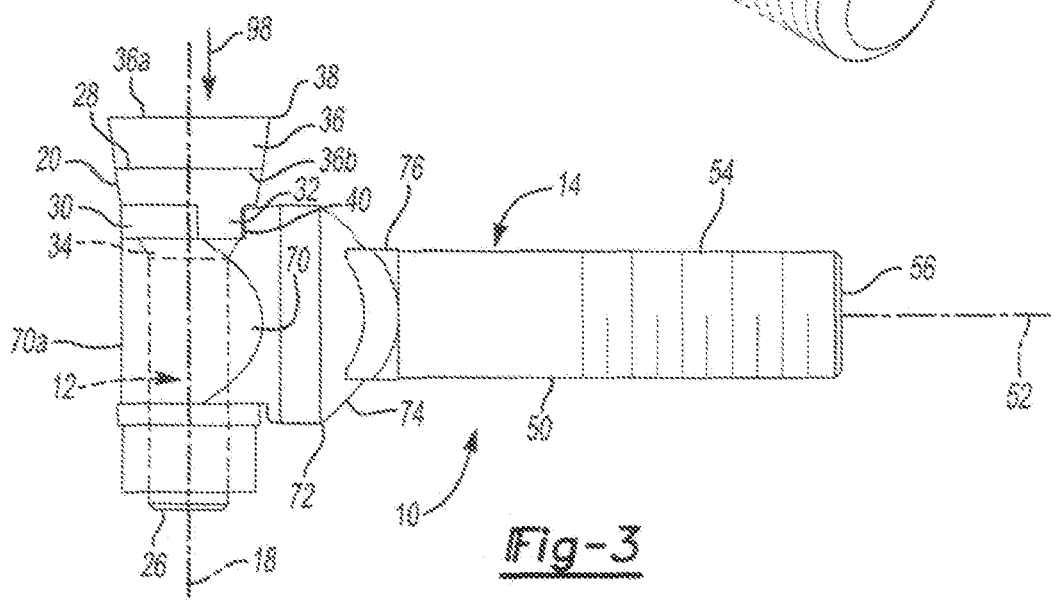
FIG. 3 is a side view of the stump cutting tool of FIG. 1.

Referring now to the drawings, specifically, FIGS. 1-5, there is shown a stump cutting tool, seen generally at 10, including a cutting tooth 12 and a tooth holder 14. The cutting tooth 12 includes a generally cylindrical shank 16 extending along a longitudinal axis 18. The cutting tooth 12 includes a head 20 located on a first end 22 and fastening or retention mechanism, shown here in as a plurality of threads 24, located on or adjacent a second or opposite end 26. As set forth herein, the threads 24 receive a retaining member, such as a nut 42. Since the fastening mechanism 24 functions to secure the cutting tooth 12 to the tooth holder 14, other fastening mechanisms including those using other types of retaining members can also be used. For example a spring-loaded retaining pin or detent member located on the shank, a retaining ring that fits into a groove on the shank or a spring-loaded ring located on the shank and engaging the tooth holder 14 are suitable for retaining or fastening the cutting tooth 12 to the tooth holder 14. In addition, the fastening mechanism may include tapering a portion of the shank 16 of the cutting tooth 12 whereby the tapered portion fits into a correspondingly tapered aperture located in the tooth holder 14. Accordingly, while the threads 24 are illustrated as one example of a fastening mechanism for attaching or fastening the cutting tooth 12 to the tooth holder 14, other fastening mechanisms are also suitable and come within the scope of the present invention. The head 20 includes a generally planar surface 28 extending transverse the longitudinal axis 18 of the shank 16. The head 20 is generally cylindrical in shape and includes a plurality of flats or detent surfaces 30 located on or about the outer circumferential surface 32 of the head 20. As illustrated in FIG. 3 a fillet 34 located at the intersection of the head 20 and the shank 16 reduces stress concentrations at the intersection or joint and increases robustness of the cutting tooth 12.

A planar surface 28 of the head 20 has a cutting bit 36 attached thereto. As illustrated herein, the cutting bit 36 is a generally cylindrical member having front and rear surfaces 36a, 36b. The front surface 36a being concave with a continuous cutting edge 38 extending around the outer periphery of the cutting bit 36. Typically, a brazing operation attaches the rear surface 36b of the cutting bit 36 to the head 20 of the cutting tooth. The cutting bit 36 is the consumable good; i.e., once the cutting edge 38 on the cutting bit 36 becomes dull, the cutting bit 36 is used up and needs replacement.

The flats or detent surfaces 30 form part of an indexing structure located on the head 20 of the cutting tooth 12. Each of the flats 30 correspond to a discrete portion or peripheral length of the cutting edge 38 typically located opposite the flat 30. For an example, as illustrated the present invention shows three flats 30, wherein each flat corresponds to one third or 120° of the peripheral edge of the cutting bit 36. With many prior art cutting tools, the cutting operation used only a portion of the cutting edge of the cutting bit. Whereby the present invention provides a plurality of detent surfaces 30 on the outer circumferential surface 32 of the head 20 that cooperate with a detent ledge or shoulder 40 located on the tooth holder 14 to select and secure a particular portion or peripheral length of the cutting edge 38 used for and during the cutting operation.

The detent surfaces 30 maximize the usable life of the cutting bit 36 by enabling rotation of the cutting bit 36 about the longitudinal axis 18 of the shank 16 as illustrated by the arrow to expose a new or fresh cutting edge 38. Accordingly, when one portion or section of the cutting edge 38 becomes dull, moving the cutting tooth 12 longitudinally in the direction of its longitudinal axis 18 disengages the flat or detent surface 30 from the shoulder surface 40 enabling rotation of the cutting tooth 12 to expose a new or fresh cutting edge 38. Once rotated, moving the cutting tooth 12 longitudinally in the opposite direction reengages the flat or detent surface 30 with the shoulder surface 40 to secure the cutting tooth 12 in place and prevent rotation thereof.

As set forth above, the threads 24 located on the shank 16 adjacent the second or opposite end 26 of the shank 16 are one example of a fastening mechanism or structure used to attach the cutting tooth 12 to the tool holder 14. When used, the threads 24 cooperate with a threaded fastener or nut 42 to secure the cutting tooth 12 to the tooth holder 14. In addition, a washer 44, of the type including a flat or lock washer, placed between the nut 42 and the tooth holder 14 cooperates with the nut 42 to secure the cutting tooth 12 to the tooth holder 14.

The tooth holder 14 includes an elongated shank 50 extending along a longitudinal axis 52. The shank 50 also having a fastening mechanism, illustrated as a plurality of threads 54 located at a first end 56 and a head portion 58 located at a second or opposite end 60. The head portion 58 includes a bore 62 extending therethrough from a front or leading face 64 to a rear or trailing face 66. A chamfer 68 extends from the front or leading face 64 to the bore 62 and receives the fillet 34 on the cutting tooth 12 when the cutting tooth is placed in the bore 62. The shoulder 40 is located on the head portion 58 adjacent or near the bore 62 and, as set forth previously, receives one of the flat or detent surfaces 30 to secure and prevent rotation of the cutting tooth 12.

Figure 4:
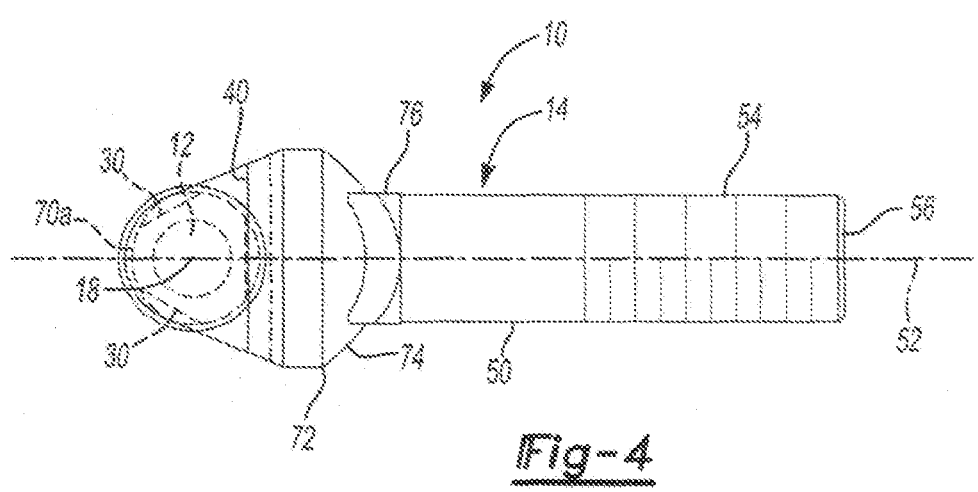
FIG. 4 is a front view of the stump cutting tool of FIG. 1.
Figure 5:
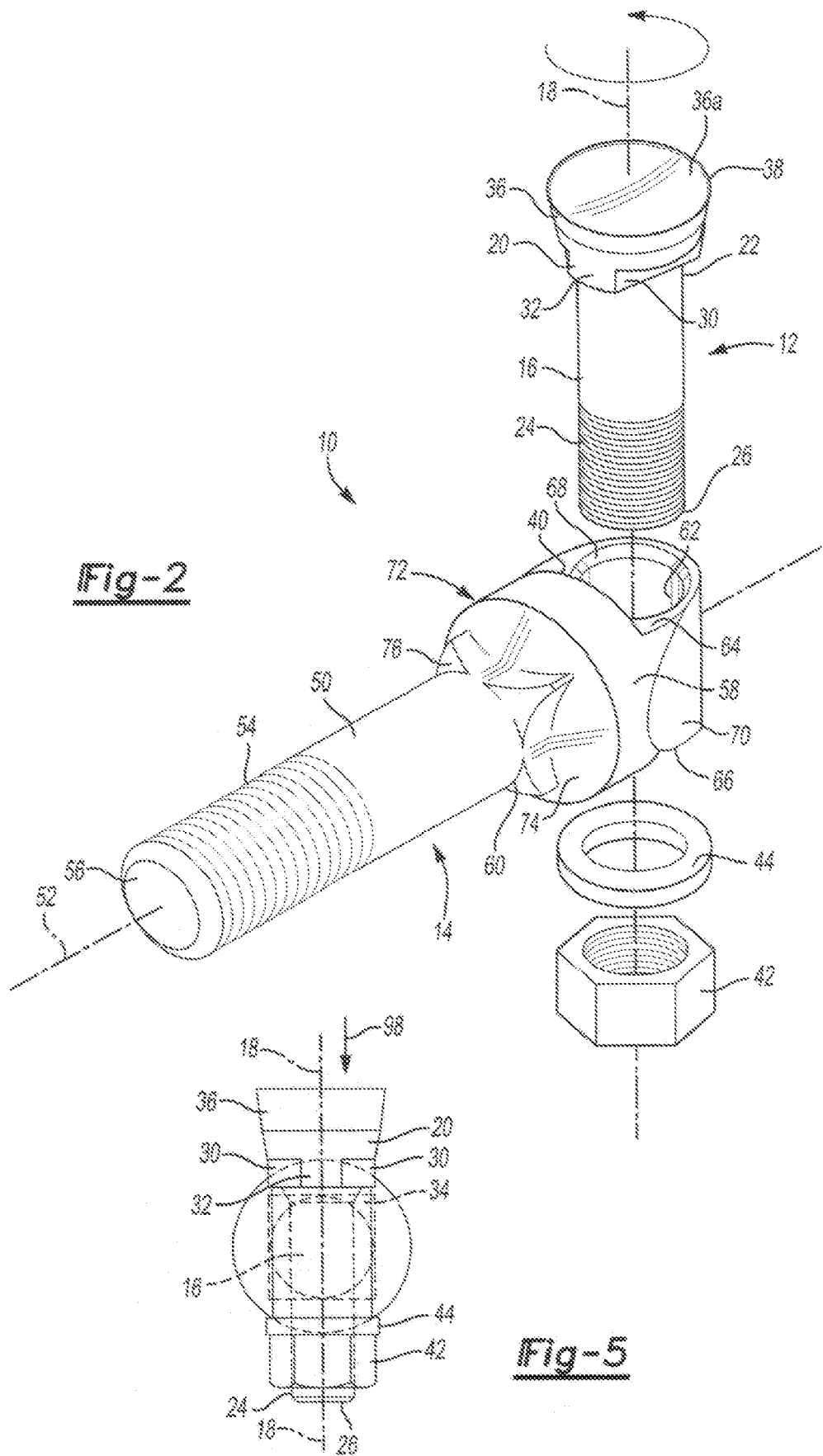
FIG. 5 is an end view of the stump cutting tool of FIG. 1.

The outer surface 70 of the head portion 58 has a curved or substantially U-shaped profile or configuration that is less than the profile or configuration of the cutting bit 36, with the base of the U-shape forming the top surface 70a of the head 58, which is situated below the cutting edge 38 of the cutting bit 36. As illustrated in FIGS. 3-5 viewing the cutting tool 10 along the longitudinal axis 18 of the cutting tooth 12 in the direction of the arrow 98 shows that the head portion 58 lies behind the cutting bit 36 and therefore is not subjected to the cutting forces and the attendant wear and abrasion resulting therefrom. The head 58 further includes a mounting portion 72 including a generally spherical surface 74 and a detent or anti-rotation structure 76. The detent or anti-rotation structure 76, shown herein as having a square cross-sectional shape, cooperates with the mounting block or pocket 80 to prevent the tooth holder 14 and correspondingly the cutting tooth 12 from turning or rotating relative to the mounting block or pocket 80.

Figure 6:
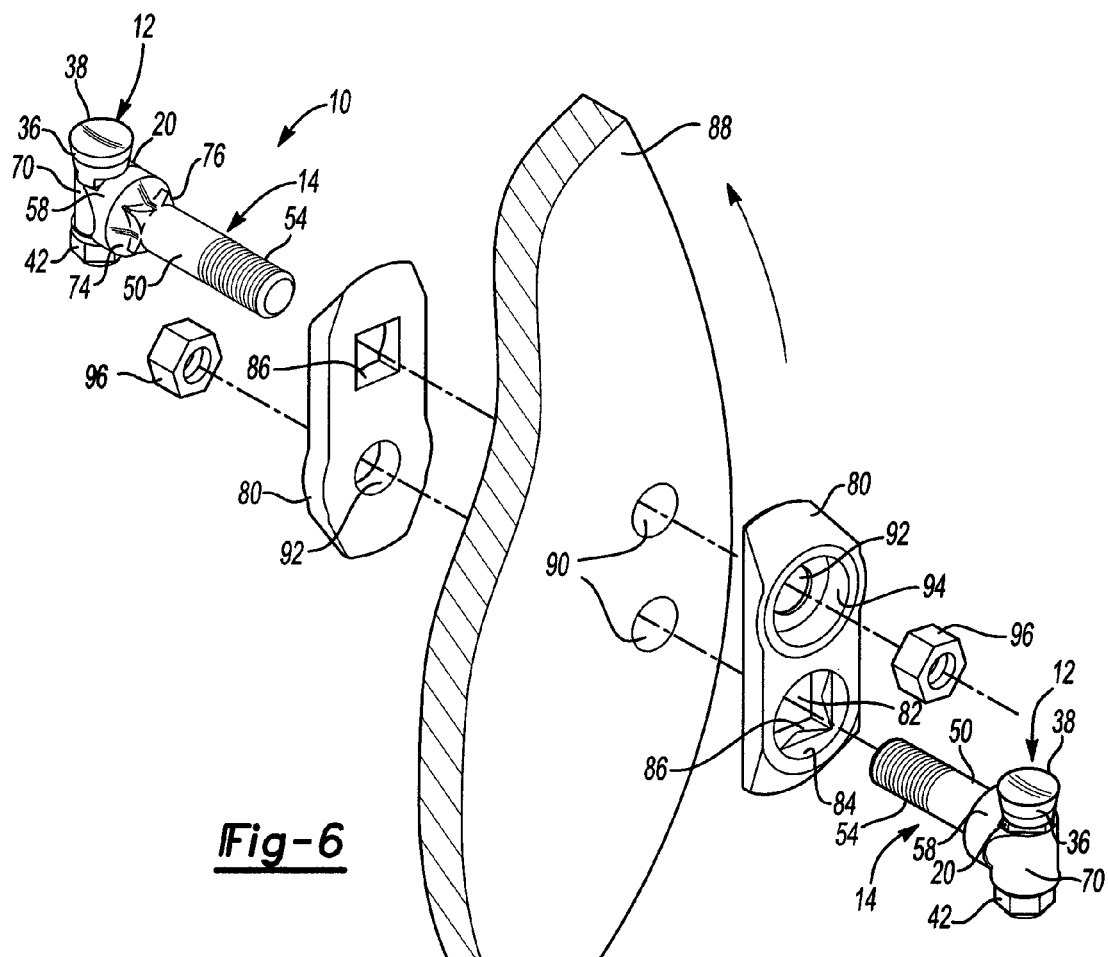
FIG. 6 is an exploded perspective view of the stump cutting tool of FIG. 1 illustrated with a mounting block and a cutting wheel.
Figure 7:
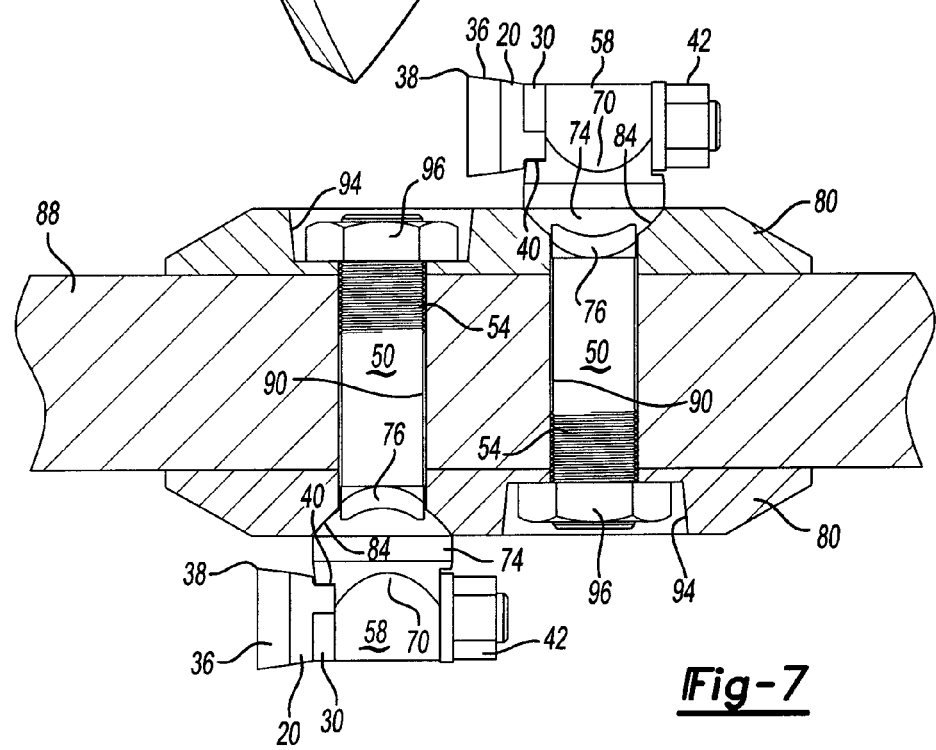
FIG. 7 is a partial cross-sectional view illustrating the stump cutting tool of FIG. 1 attached to a cutting wheel.

As illustrated in FIGS. 6 and 7 the mounting block or pocket 80 has at least one aperture 82 having a spherical recess 84 complementary to the generally spherical surface 74 on the tooth holder 14. A portion of the aperture 82 has a non-circular cross-section 86, shown here as square, that corresponds to the square, cross-sectional shape of the detent or anti-rotation structure 76 located on the tooth holder 14. As illustrated, the mounting blocks or pockets 80 are typically attached in pairs to a cutting wheel 88 through a pair of apertures 90. Each mounting block or pocket 80 includes a second aperture 92 extending transversely through the mounting block 80. Adjacent to the second aperture 92 is a countersunk portion 94 sized to receive a threaded fastener 96 used to secure the tooth holder 14 to the cutting wheel 88. Accordingly, the two mounting blocks or pockets 80 are identical in configuration wherein one of the mounting blocks or pockets 80 is rotated 180° about it's longitudinal axis prior to installing the tooth holders 14.

Initially, the tooth holders 14 are installed or fastened to the cutting wheel 88 using the mounting blocks or pockets 80. This is accomplished by inserting the tooth holder 14 into the aperture 82 on the mounting block 80 such that the spherical surface 74 of the head portion 58 is seated in the spherical recess 84 of the mounting block or pocket 80. The threaded fastener or nut 96 then engages the threads 54 located at or adjacent the first end 56 of the shank 50. As illustrated, the detent or anti-rotational rotation structure 76 of the head portion 58 is seated in the non-circular cross-section portion 86 of the mounting block or pocket 80. This secures the tooth holder 14 in place on the cutting wheel 88. A second tooth holder 14 is installed on the opposite side of the cutting wheel 88 in the same manner. The tooth holders 14 may be installed with or without the cutting tooth 12 in place.

Once the cutting teeth 12 are installed on the respective tool holders 14, the stump cutting apparatus is ready for operation. As the apparatus cuts or grinds a stump, the cutting teeth 12, specifically the cutting edge 38 of each individual cutting tooth 12, becomes dull. In order to provide a new cutting edge 38, the nut 42 is loosened whereby the cutting bit 36 is rotated to expose a fresh cutting edge 38. After each of the respective edges, i.e., the edges corresponding to the flats or detent surfaces 30, of the cutting bit 36 become dull, the cutting tooth can be replaced by loosening the nut 42, removing the cutting tooth 12 and installing a new cutting tooth 12.

Accordingly, the present invention provides a replacement cutting tooth 12 and a tooth holder 14. Specifically removal and replacement of the cutting tooth 12 takes place while the tooth holder 14 remains attached to the cutting wheel 88. The preferred embodiment shows one type of replaceable cutting tooth 12 having a indexing structure. Other indexing structures along with other cutting bit 36 configurations or shapes, instead of the cylindrical cutting bit 36, can also be used. Further, although the tooth holder 14 is shown herein attached using a plurality of threads 54 and a nut 96, as with the cutting tooth 12 other fastening structures such as clips, split rings and press or snap fit arrangements are also suitable for attaching the tooth holder 14 to the cutting wheel 88. Although both the cutting tooth 12 and the tooth holder 14 employ a fastening mechanism for securing the respective components, the cutting tooth 12 and tooth holder 14 may use different fastening mechanisms in a single stump cutting tool 10. For an example, both the cutting tooth 12 and the tooth holder 14 of the disclosed embodiment are shown using a plurality of threads 24, 54 and a threaded fastener 42, 96 as the fastening means. The present invention, however, also contemplates using variety of fastening mechanism combinations including a spring-loaded ring disposed on the shank 16 of the cutting tooth 12 that engages the head portion 58 of the tooth holder 14 to secure the cutting tooth 12 to the tooth holder 14 while using a plurality of threads 54 on the shank 50 and a nut 96 to secure the tooth holder 14 to the cutting wheel 88. Thus, although the term fastening mechanism is used to describe the structure used to attach the cutting tooth 12 to the tooth holder 14 and the tooth holder 14 to the cutting wheel 88, it does not require that the same structure be used with both the cutting tooth 12 and tooth holder 14.

In accordance with the invention, the consumable components of the stump cutting tool 10 are reduced. For example, the present invention eliminates the need to replace the entire tool holder 14 when the cutting bit 36, specifically the cutting edge 38 or a portion thereof, becomes dull. Further, fabrication of the cutting tooth 12 can be achieved at a cost less than the tooth holder 14 thereby reducing the overall costs of the cutting tool assembly 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stump cutting tool for use with a stump cutting apparatus comprising:

a cutting tooth including a shank having first and second spaced apart ends and extending along a longitudinal axis, a head located adjacent said first end, and a cutting bit attached to said head of said cutting tooth; and a tooth holder including a shank having first and second spaced apart ends and extending along a longitudinal axis, a head located adjacent said first end of said shank of said tooth holder and a fastening mechanism located on said shank of said tooth holder adjacent said second end of said shank of said tooth holder, said head of said tooth holder having a bore extending through said head of said tooth holder from a front face to a rear face, said bore extending in a direction generally transverse to said longitudinal axis of said tooth holder wherein said shank of said cutting tooth is disposed and secured within said bore.

2. A stump cutting tool for use with a stump cutting apparatus as set forth in the claim 1 including an indexing structure located on said head of said cutting tooth, said indexing structure cooperating with said head of said tooth holder to secure said cutting bit at a plurality of discrete positions.

3. A stump cutting tool for use with a stump cutting apparatus as set forth in claim 2 wherein said indexing structure includes at least one detent surface located on an outer peripheral surface of said head of said cutting tooth and a shoulder located on said head of said tooth holder wherein said detent surface cooperates with said shoulder to prevent rotation of said cutting tooth.

4. A stump cutting tool for use with a stump cutting apparatus as set forth in claim 1 including a fastening mechanism located adjacent said second end of said shank of said cutting tooth.

5. A stump cutting tool for use with a stump cutting apparatus as set forth in claim 4 wherein said fastening mechanism located adjacent said second end of said shank of said cutting tooth includes a plurality of threads.

6. A stump cutting tool for use with a stump cutting apparatus as set forth in claim 5 wherein said fastening mechanism located on said shank of said tooth holder includes a plurality of threads.

7. A stump cutting tool for use with a stump cutting apparatus as set forth in claim 1 including a fillet disposed between said head of said cutting tooth and said shank of said cutting tooth.

8. A stump cutting tool for use with a stump cutting apparatus as set forth in claim 1 wherein said head of said cutting tooth includes an outer peripheral surface and a front surface; and said cutting bit having an outer peripheral surface and a front surface and a rear surface, said rear surface of said cutting bit positioned adjacent said front surface of said head portion and said front surface of said cutting bit including a peripheral outer edge forming a cutting edge.

9. A stump cutting tool for use with a stump cutting apparatus as set forth in claim 8 including said front surface of said cutting bit having a substantially concave shape.

10. A stump cutting tool for use with a stump cutting apparatus as set forth in claim 8 including said outer peripheral surface of said head of said cutting tooth portion having a substantially cylindrical shape and said outer peripheral surface of said cutting bit having a substantially cylindrical shape.

11. A stump cutting tool for use with a stump cutting apparatus as set forth in claim 1 wherein said head portion of said tooth holder includes an outer surface, said outer surface having a configuration such that it remains hidden behind said cutting bit when viewing in front face of said cutting bit in the direction of the longitudinal axis of the cutting tooth.

12. A stump cutting tool for use with a stump cutting apparatus as set forth in claim 11 wherein said outer surface of said head of said tooth holder has a substantially U-shaped configuration with the base of said U-shape forming a top surface of said head of said tooth holder.

13. A stump cutting tool for use with a stump cutting apparatus as set forth in claim 1 including a chamfer located at and extending from said front face of said tooth holder to said bore located in said head of said tooth holder.

14. A stump cutting tool for use with a stump cutting apparatus as set forth in claim 1 wherein said head of said tooth holder includes an anti-rotation structure located adjacent said shank of said tooth holder.

15. A stump cutting tool for use with a stump cutting apparatus as set forth in claim 14 wherein said anti-rotation structure includes a portion of said head of said tooth holder having a noncircular cross-sectional shape.

16. A stump cutting tool for use with a stump cutting apparatus as set forth in claim 14 including said head of said tooth holder having a lower surface, said lower surface having a generally spherical configuration.

17. A stump cutting tool for use with a stump cutting apparatus comprising:
   a cutting tooth including a shank having first and second spaced apart ends and extending along a longitudinal axis, a head located adjacent said first end of said shank of said cutting tooth, and a cutting bit attached to said head of said cutting tooth;
   an indexing structure including at least one detent surface located on an outer peripheral surface of said head of said cutting tooth;
   a tooth holder including a shank having first and second spaced apart ends and extending along a longitudinal axis, a head located on said first end of said shank of said tooth holder and a fastening mechanism located on said shank of said tooth holder adjacent said second end of said shank of said tooth holder , said head of said tooth holder having a bore extending through said head of said tooth holder from a front face to a rear face, a lower surface, said lower surface having a generally spherical configuration and an anti-rotation structure located adjacent said shank of said tooth holder; and
   wherein at least a portion of said cutting tooth is disposed and secured within said bore.

18. A stump cutting tool for use with a stump cutting apparatus as set forth in claim 17 including a fastening mechanism located adjacent said second end of said shank of said cutting tooth.

19. A stump cutting tool for use with a stump cutting apparatus as set forth in claim 17 including said cutting tooth having a plurality of threads located on said shank adjacent said second end of said cutting tooth, said cutting tooth disposed within said bore such that said head of said cutting tooth is adjacent said front face of said head of said tooth holder and said shank extends through said bore such that a portion of said threads on said second end of said shank of said cutting tooth extend past and outward of said rear face of said head of said tooth holder; and
   a nut threadably received on said threads located on said second end of said shank of said cutting tooth, said nut operative to the secure said cutting tooth to said tooth holder.

20. A stump cutting tool for use with a stump cutting apparatus as set forth in claim 17 wherein said indexing structure includes at least one detent surface located on an outer peripheral surface of said head of said cutting tooth; and
   a shoulder located on said head of said tooth holder whereby said detent surface cooperates with said shoulder to prevent rotation of said cutting tooth.

21. A stump cutting tool for use with a stump cutting apparatus as set forth in claim 17 including said head of said tooth holder having an outer surface, said outer surface extending between said front face and said rear face, said outer surface having a configuration that is smaller than the configuration of the cutting bit when viewed in the direction of the longitudinal axis of the cutting tooth.

22. A stump cutting tool for use with a stump cutting apparatus as set forth in claim 17 wherein said cutting bit has a substantially cylindrical shape including a front surface and a rear surface, said rear surface positioned adjacent said head of said cutting tooth and said front surface of said cutting bit having a peripheral outer edge forming a cutting edge.

23. A stump cutting tool for use with a stump cutting apparatus comprising:
   a cutting tooth including a shank having first and second spaced apart ends and extending along a longitudinal axis, a head located adjacent said first end of said shank of said cutting tooth, and a cutting bit attached to said head of said cutting tooth;
   a tooth holder including a shank having first and second spaced apart ends and extending along a longitudinal axis, a head located adjacent said first end of said shank of said tooth holder and a fastening mechanism located on said shank of said tooth holder adjacent said second end of said shank of said tooth holder, said head of said tooth holder having a bore extending transverse said longitudinal axis of said shank and through said head of said tooth holder from a front face to a rear face, said head having a lower surface, said lower surface having a generally spherical configuration, and an anti-rotation structure located adjacent said lower surface of said head and said shank of said tooth holder wherein at least a portion of said cutting tooth is disposed within said bore; and
   a fastening mechanism located adjacent said second end of said shank of said cutting tooth for releaseably securing said cutting tooth within said bore.

24. A stump cutting tool for use with a stump cutting apparatus as set forth in claim 23 including an indexing structure located on said head of said cutting tooth, said indexing structure cooperating with said head of said tooth holder to secure said cutting bit at a plurality of discrete positions.

25. A stump cutting tool for use with a stump cutting apparatus as set forth in claim 23 wherein said fastening mechanism includes a plurality of threads and a nut engaging said threads and contacting said rear face of said head of said tooth holder.

* * * * *